Dec. 13, 1966 K. M. KOSANKE ET AL 3,292,091

ENERGY CONSERVING CIRCUIT FOR CAPACITIVE LOAD

Filed Feb. 24, 1965

INVENTORS
KURT M. KOSANKE
WERNER W. KULCKE
ERHARD MAX

BY Ralph C. [signature]
ATTORNEY

United States Patent Office 3,292,091
Patented Dec. 13, 1966

3,292,091
ENERGY CONSERVING CIRCUIT FOR CAPACITIVE LOAD

Kurt M. Kosanke, Wappingers Falls, Werner W. Kulcke, Poughkeepsie, and Erhard Max, Wappingers Falls, N.Y., assignors to International Business Machines Corporation, Armonk, N.Y., a corporation of New York Filed Feb. 24, 1965, Ser. No. 434,998
6 Claims. (Cl. 328—67)

This invention relates to energy conserving circutis, and more particularly to circuits adapted to apply a voltage across a capacitive load and then to remove the voltage from the load with a minimum loss of energy.

It is customary practice to use electro-optic crystals as active components in optical devices such as light shutters, light deflectors and light modulators. Upon applying an electrical voltage to one of the crystals, a change takes place in its birefringent properties so that a polarized light beam passing therethrough experiences a phase retardation depending upon the electric field. The crystal, thterefore, may be used as a means for controlling a light beam's properties such as phase, polarization status or, in combination with other inactive elements, amplitude or propagation direction. When a crystal is used in an optical binary system, the half wavelength voltage is applied to effect a change in the polarization direction of a linearly polarized light beam by 90 degrees.

Electrically, most of the electro-optic crystals behave as dielectrics with high dielectric constants and very low dielectric losses. Establishing an electric field in the crystal consists of the charging of a low-loss capacitor by some voltage. Restoration of the crystal to a field-free condition is accomplished by discharging the crystal or capacitor so as to remove from it all electrostatic energy.

In known electro-optic materials, the half wavelength voltage assumes values in the order of some kilovolts, such as 3.4 kv. in deuterated potassium dihydrogen phosphate (KDP). The capacity of a crystal depends on its geometrical dimensions but a typical crystal plate has a capacity in the order of $10^2 \mu\mu F$. Uusing the values mentioned, the electric energy necessary to effect a 90 degree change in polarization amounts to approximately 0.5 millijoules. A crystal plate may be switched from its normal state by charging it with the required energy and then returned to its normal state by dissipating the energy into a resistor. At low operating speeds, such as $10^3$ operations per second, the power consumption would be 0.5 watt when using the above-mentioned values. At high speeds of operation, however, the dissipated energy increases rapidly and makes such operation uneconomical.

It is a principal object of this invention to provide circuitry which effects the switching of a crystal with a power consumption determined only by dielectric losses. This is accomplished by discharging electric energy from a crystal after switching to a storing element which may consist of a capacitor, an inductance or a delay line.

In a preferred form of the invention, a crystal plate forming part of electro-optic device is connected through an inductance to a tank capacitor so as to form an oscillating circuit. At each end of the inductance is a diode connected in a manner to pass current from the inductance and to block the flow of current in the opposite direction. Connected across each of the diodes is a switch, these switches being close intermittently so as to transfer electrostatic energy from the tank capacitor to the crystal plate and then to return elecrostatic energy from the crystal plate to the tank capacitor. After each return of energy to the capacitor, a voltage pulse is applied to the latter through a diode to compensate for any losses occurring during the operation of the system.

The foregoing and other objects, features and advantages of the present invention will be apparent from the following more particular description of the preferred embodiment as illustrated in the accompanying drawings.

Figure 1:
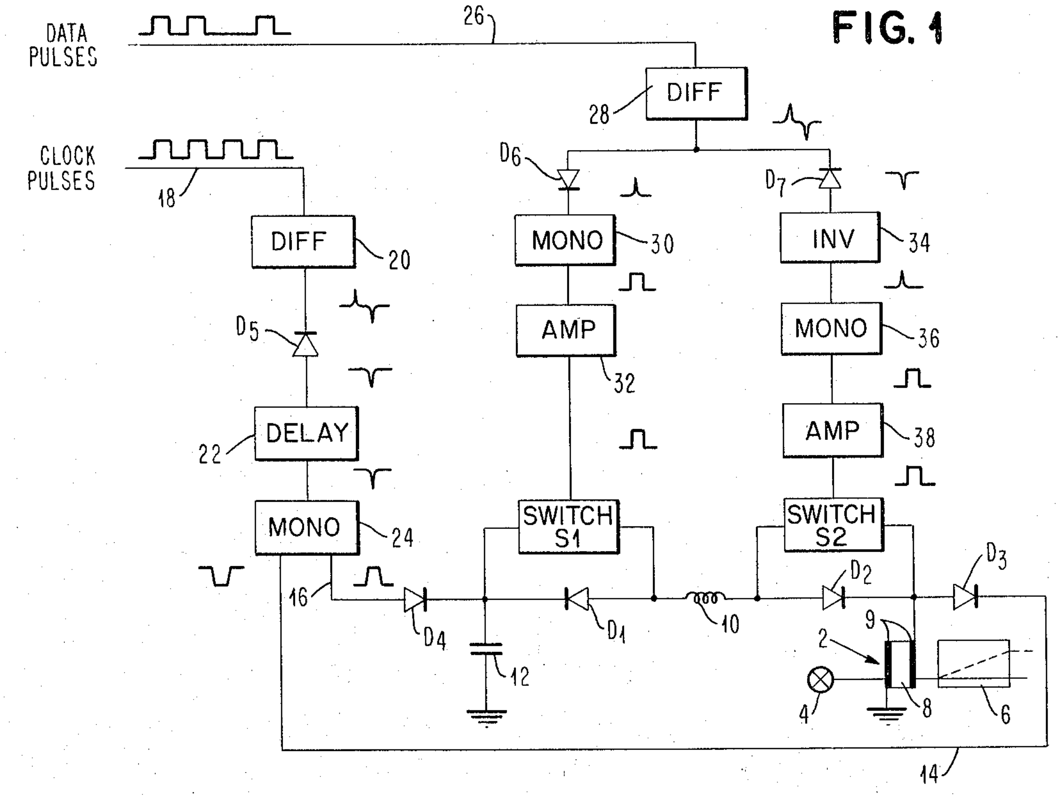
FIG. 1 is a schematic diagram of a system in which the improved energy conserving circuit is embodied.

There is shown in FIG. 1 an electro-optic device 2 through which a beam of linearly polarized light passes from a source 4 to a birefringent element 6. The device 2 comprises an electro-optic crystal 8 having a transparent electrode 9 at each of its sides. The birefringent element operates to pass light either as an ordinary ray or an extraordinary ray depending on its direction of polarization. A light beam polarized perpendicular to the plane of the drawing passes, for example, through the birefringent element without deflection as the ordinary ray. When the light beam is polarized parallel to the plane of the drawing it passes through the element in a different direction as the extraordinary ray and leaves the element at a point laterally spaced from the output of the ordinary ray. With no voltage between the electrodes 9, the light beam passes through the device 2 without any change in its direction of polarization and this direction may be assumed to be perpendicular to the plane of the drawing. When a half wave voltage is applied across the electrodes 9, the direction of polarization is rotated 90 degrees as it passes through the device 2 and a deflection of the light takes place in the element 6. The device 2 and the element 6 form one stage of a light deflector which may have additional stages. A deflector having several stages like that described is shown and described more completely in a U.S. application by T. J. Harris et al., Serial No. 285,832, filed June 5, 1963. It will be understood that the light deflector is shown herein only as an example of an apparatus in which a crystal may have a potential applied across it to produce an effect on a light beam different from that which exists when the potential is removed.

For effecting a rotation of the polarization direction by 90 degrees in the apparatus shown, it is necessary that the potential across the electrodes 9 be switched between zero and the half wave potential which, if the crystal is potassium dihydrogen phosphate, is equal to 3.4 kv. To accomplish this with minimum energy loss, one of the electrodes 9 is connected to ground while the other electrode is connected through an inductance 10 to one side of a tank capacitor 12 which is connected at its other side to ground. Arranged in the circuit at each end of the inductance are diodes $D_1$ and $D_2$ which are connected in a manner to block the flow of current toward the inductance but to permit current flow in the opposite direction. Bypassing the diodes $D_1$ and $D_2$ are circuits including switches $S_1$ and $S_2$, respectively.

Assuming that the tank capacitor is charged to an initial voltage $V_1$ and the voltage on the crystal 8 is zero, a closing of switch $S_1$ while switch $S_2$ remains open results in a discharge of the tank capacitor 12 through switch $S_1$, inductance 10 and diode $D_2$ to place a voltage on crystal 8. Since each of the circuit elements offers some resistance to the flow of current, all of the charge on the tank capacitor is not transferred to the crystal. In order that a half wave voltage may exist on the crystal by the discharging of the tank capacitor, it is necessary that the initial voltage $V_1$ be greater than the half wave voltage by an amount equal to the voltage remaining on the tank capacitor after discharging. With the switch $S_2$ open and the diode $D_2$ blocking the flow of current toward the inductance 10, energy cannot be discharged back through the inductance to the capacitor 12. To remove the charge from the crystal 8, the switch $S_1$ is opened and the switch $S_2$ is closed. The crystal now discharges through the switch $S_2$, the inductance 10 and the diode $D_1$ to the tank capacitor 12. Due to the loss resistance of the circuit, the transfer of the charge from the crystal to the capacitor is not complete and a small charge remains on the crystal. Since the potential on the crystal must be reduced to zero in order that the polarization direction of the light may be rotated 90 degrees, a circuit is provided from the ungrounded terminal 9 through a diode $D_3$ to a conductor 14 which is normally subjected to a voltage equal to the initial voltage $V_i$ to which the tank capacitor is originally charged. Diode $D_3$ is biased in a direction to pass current only from the terminal 9 to the conductor 14 so that no charging of the crystal can take place from this source. Soon after the switch $S_2$ is opened following the discharge of voltage from the crystal 8 to the tank capacitor, the voltage on conductor 14 is reduced to zero in a manner to be described shortly. Any voltage remaining on the crystal at this time is discharged through diode $D_3$ and the conductor 14 so the crystal is returned to its normal state and has no effect on the polarization of light passing through it.

The voltage on the tank capacitor 12 after the discharge of energy to it from the crystal 8 through the inductance 10 is less than the initial voltage $V_i$ by the amount of energy remaining on the crystal when switch $S_2$ is opened. To compensate for this loss, the tank capacitor 12 is connected through a diode $D_4$ to a conductor 16 which is normally at zero potential but is subjected to a potential equal to the initial voltage $V_i$ at the same time that the voltage on conductor 14 is reduced to zero. Diode $D_4$ is connected in a manner to pass current from the conductor 16 to the tank capacitor 12 and to block current flow in the opposite direction.

For regulating the voltages on the conductors 14 and 16, clock pulses are delivered through a conductor 18 to a differentiating circuit 20 which produces at its output side a positive pulse at the leading edge of each clock pulse and a negative pulse at the trailing edge of each clock pulse. The output side of the differentiating circuit is connected through a diode $D_5$ to a delay circuit 22, the diode $D_5$ being connected in a manner to pass only the negative pulses from the differentiating circuit. The need for the delay circuit will be explained later during a discussion of the timing diagram. Delayed negative pulses are conducted from the output side of the delay circuit 22 to a monostable circuit 24 having two outputs, one connected to the conductor 14 and the other connected to the conductor 16. The output connected to conductor 14 is normally maintained at the initial potential $V_i$ but is reduced to zero potential when a negative input pulse is received by the circuit 24. The potential at the output connected to conductor 16 is normally equal to zero but is increased to the initial voltage $V_i$ on reception of a negative input pulse by the circuit 24.

Switches $S_1$ and $S_2$ are normally open and are closed under the control of data pulses supplied through a conductor 26 to a differentiating circuit 28 which provides at its output a positive pulse and a negative pulse at the leading and trailing edges, respectively, of each data pulse. From the output of the circuit 28 are two circuits, one leading to the switch $S_1$ and the other leading to switch $S_2$. In the circuit to $S_1$ is a diode $D_6$ connected in a manner to pass only the positive pulses received from the circuit 28. These positive pulses are delivered to a monostable circuit 30 which produces at its output a square wave pulse that is amplified by an amplifier 32 and then is delivered to the switch $S_1$. The circuit to the switch $S_2$ includes a diode $D_7$ connected to pass only the negative pulses from the circuit 28. These pulses are passed through an inverter 34 to a monostable circuit 36 which provides a square wave pulse at its output. The pulses from the circuit 36 are amplified by an amplifier 38 and delivered to the switch $S_2$.

Figure 2:
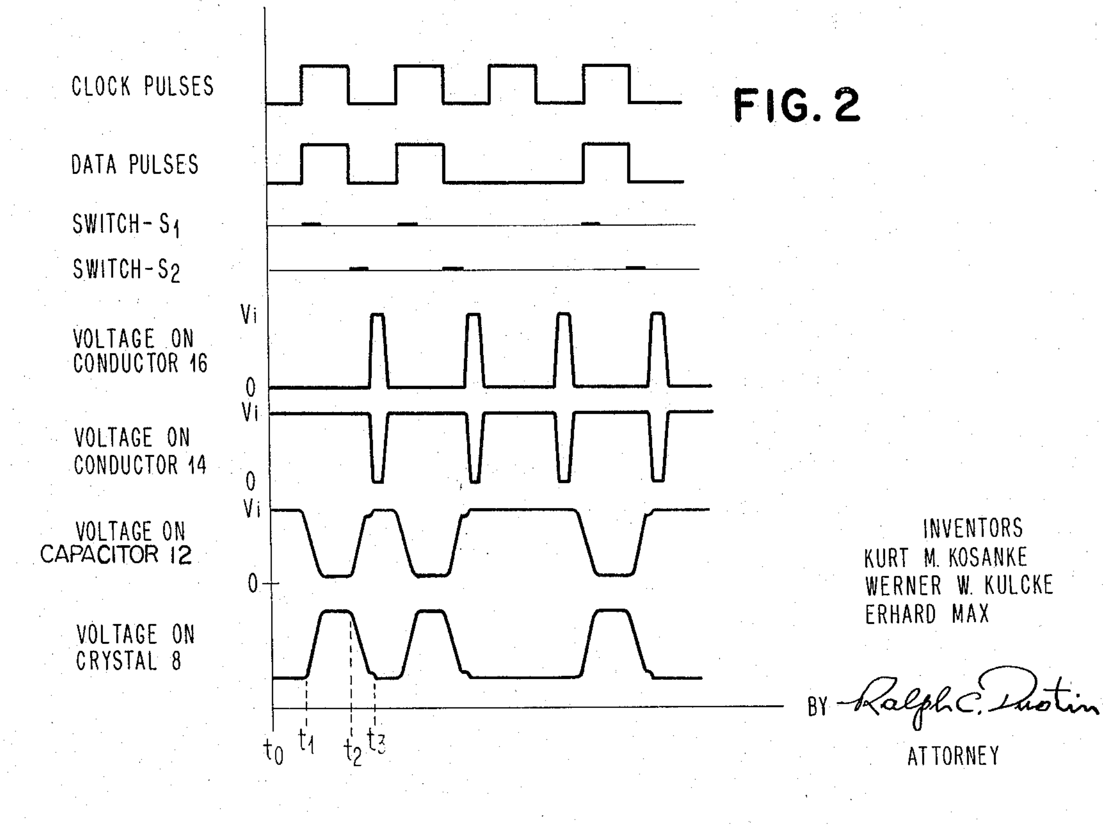
FIG. 2 is a timing diagram indicating the voltage pulses and the switch operations.

Referring to the timing diagram of FIG. 2 it will be noted that the leading and trailing edges of each data pulse are in step with the same edges of a corresponding clock pulse. There is not necessarily, however, a data pulse for each clock pulse. As shown, at time $t_0$ the switches $S_1$ and $S_2$ are open and the tank capacitor 12 is charged to the initial voltage $V_i$ while the voltage across the crystal 8 is zero. Voltages applied to the conductors 14 and 16 are equal to $V_i$ and zero, respectively. At time $t_1$, the leading edge of the first data pulse operates through the differentiating circuit 28 to produce a positive pulse which passes the diode $D_6$ and conditions the monostable circuit 30 for delivering a square wave pulse through the amplifier 32 to switch $S_1$. This switch closes and discharges the capacitor 12 through the inductance 10 and diode $D_2$ to the crystal 8. A slight voltage remains on the capacitor 12 due to circuit resistance but the discharge is sufficient to raise the voltage across the crystal to the half wave value which, if the crystal is made of potassium dihydrogen phosphate, equals 3.4 kv. As soon as the discharge of the tank capacitor is completed, the switch $S_1$ opens. At the trailing edge of the data pulse, indicated as time $t_2$, a negative pulse is produced by the differentiating circuit 28. This pulse passes the diode $D_7$ to the inverter 24 which delivers a positive pulse to the monostable circuit 36. A square wave pulse from the circuit 36 is amplified and applied to the switch $S_2$ for closing the latter. The crystal 8 now discharges through the switch $S_2$, the inductance 10 and the diode $D_1$ to the capacitor 12. Again, due to circuit resistance, the discharge of the crystal 8 is not quite complete.

From time $t_0$ until the discharge of energy from the crystal 8 to the capacitor 12 has been completed, the voltage on conductor 14 is maintained at the value $V_i$ so that no discharge could take place from the crystal to the conductor 14 through diode $D_3$. The voltage on conductor 16 was maintained at zero during the same period so the discharge of energy in both directions between the capacitor 12 and the crystal 8 could take place without interference. At the leading edge of the first clock pulse, the differentiating circuit 20 produces a positive pulse but nothing happens because this pulse is blocked by the diode $D_5$. When the trailing edge of the clock pulse is applied to the differentiating circuit, a negative output pulse is produced and this passes the diode $D_5$ to the delay circuit 22. The trailing edge of a data pulse appears at the same time to effect the closing of switch $S_2$ as described above. Delay circuit 22 operates to energize the monostable circuit 24 at time $t_3$, just after the switch $S_2$ opens. This results in the application of a voltage $V_i$ on conductor 16 and a reduction of the voltage on conductor 14 to zero. The small voltage remaining on crystal 8 after the switch $S_2$ opens now discharges through diode $D_3$ to the conductor 14. Voltage on conductor 16 acts at the same time through diode $D_4$ to increase the charge on capacitor 12 to the initial value $V_i$.

By the time the leading edge of the next clock pulse arrives, the voltage on conductor 16 is again reduced to zero and the voltage on conductor 14 is increased to the value $V_i$. If another data pulse appears simultaneously with the clock pulse, the switches $S_1$ and $S_2$ close again to effect a transfer of energy between the capacitor 12 and the crystal 8 as described above. If no data pulse appears, the voltages on conductors 14 and 16 are still switched between zero and $V_i$ by clock pulses but nothing happens except for the possible transfer of energy to the capacitor 12 for maintaining it charged to the value $V_i$.

In a system in which more than one crystal 8 may be used, such as a multistage light deflector, separate circuits controlling switches $S_1$ and $S_2$ for each crystal would be required. Connected in the circuit with each set of switches would be a separate tank capacitor. The charging of each tank capacitor to the value $V_i$ and the discharging of each crystal to zero voltage may be effected, however, by connecting them to the output conductors of a common monostable circuit 24.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for transferring energy to and from a capacitive load comprising, in combination,
- a tank capacitor,
- a series circuit including an inductance connected between said tank capacitor and said capacitive load,
- a pair of diodes connected in said series circuit at opposite ends of said inductance, each operating to block the flow of current toward said inductance and permitting current flow in the opposite direction,
- separate switch means for bypassing each of said diodes,
- and means for operating said separate switch means successively.

2. The circuit of claim 1 including a supply line connected to said tank capacitor,
- means connected in said supply line permitting the flow of current toward said tank capacitor and blocking current flow in the opposite direction,
- and means normally subjecting said supply line to zero voltage but operating between the opening of one of said switch means and the closing of the other for subjecting said supply line to an initial voltage.

3. The circuit of claim 1 including a supply line connected to said capacitive load,
- means connected in said supply line blocking the flow of current toward said capacitive load and permitting the flow of current in the opposite direction,
- and means normally subjecting said supply line to an initial voltage but operating between the opening of one of said switch means and the closing of the other for reducing the voltage to zero.

4. The circuit of claim 1 including a pair of supply lines, one connected to said tank capacitor and the other connected to said capacitive load,
- a diode connected in one of said supply lines permitting the flow of current toward said tank capacitor and blocking current flow in the opposite direction,
- a diode connected in the other of said supply lines blocking the flow of current toward said capacitive load and permitting current flow in the opposite direction,
- and means normally subjecting the one of said supply lines connected to said tank capacitor to zero voltage and subjecting the other of said supply lines to an initial voltage,
- said last mentioned means operating between the opening of one of said switch means and the closing of the other for reversing the voltages on said supply lines.

5. The circuit of claim 1 in which said means for operating said separate switch means includes a differentiating circuit,
- means for subjecting said differentiating circuit to square wave data pulses,
- said differentiating circuit operating at the leading and trailing edges of each data pulse to produce positive and negative pulses, respectively,
- means responsive to the positive pulses from said differentiating circuit for closing one of said switch means,
- and means responsive to the negative pulses from said differentiating circuit for closing the other of said switch means.

6. a circuit for transferring energy to and from a capacitive load comprising, in combination,
- a tank capacitor,
- a series circuit including an inductance connected between said tank capacitor and said capacitive load,
- a pair of diodes connected in said series circuit at opposite ends of said inductance, each operating to block the flow of current toward said inductance and permitting current flow in the opposite direction,
- separate bypass switching circuits in shunt with each of said diodes,
- a pair of supply lines, one connected to said tank capacitor and the other connected to said capacitive load,
- a pair of differentiating circuits, each operating when subjected to the leading and trailing edges of a square wave pulse to produce positive and negative pulses, respectively,
- means for subjecting one of said differentiating circuits to square wave clock pulses,
- means for subjecting the other of said differentiating circuits to square wave data pulses having leading and trailing edges coinciding with corresponding edges of said clock pulses,
- means responsive to each positive pulse from the one of said differentiating circuits subjected to data pulses for closing one of said switching circuits,
- means responsive to each negative pulse from said differentiating circuit subjected to data pulses for closing the other of said switching circuits,
- and means responsive to each negative pulse from said differentiating circuit subjected to clock pulses for regulating voltages on said supply lines,
- said last mentioned means operating after a slight delay for increasing voltage on the supply line to said tank capacitor from zero to an initial value and decreasing the voltage on the supply line to said capacitive load from said initial value to zero.

No references cited.

ARTHUR GAUSS, *Primary Examiner.*

J. ZAZWORSKY, *Assistant Examiner.*